(12) United States Patent
Li et al.

(10) Patent No.: US 11,962,054 B2
(45) Date of Patent: Apr. 16, 2024

(54) PHASE SHIFTER AND ANTENNA

(71) Applicants: Beijing BOE Sensor Technology Co., Ltd., Beijing (CN); BOE TECHNOLOGY GROUP CO., LTD., Beijing (CN)

(72) Inventors: Liang Li, Beijing (CN); Tienlun Ting, Beijing (CN); Ying Wang, Beijing (CN); Jie Wu, Beijing (CN); Haocheng Jia, Beijing (CN); Cuiwei Tang, Beijing (CN); Qiangqiang Li, Beijing (CN); Chuncheng Che, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 498 days.

(21) Appl. No.: 17/280,897

(22) PCT Filed: Aug. 13, 2020

(86) PCT No.: PCT/CN2020/108887
§ 371 (c)(1),
(2) Date: Mar. 28, 2021

(87) PCT Pub. No.: WO2021/027870
PCT Pub. Date: Feb. 18, 2021

(65) Prior Publication Data
US 2022/0006166 A1 Jan. 6, 2022

(30) Foreign Application Priority Data
Aug. 14, 2019 (CN) .......................... 201910750772.X (51) Int. Cl.
*H01P 1/18* (2006.01)
*H01Q 3/36* (2006.01)

(52) U.S. Cl.
CPC ................. *H01P 1/18* (2013.01); *H01Q 3/36* (2013.01)

(58) Field of Classification Search
CPC .................................... H01P 1/18; H01Q 3/36
(Continued)

(56) References Cited

U.S. PATENT DOCUMENTS

| 2001/0017577 | A1 | 8/2001 | Toko et al. |
| 2019/0103671 | A1 | 4/2019 | Dong et al. |
| 2019/0243191 | A1* | 8/2019 | Liu ........................ G02B 26/06 |

FOREIGN PATENT DOCUMENTS

| CN | 107453013 A | 12/2017 |
| CN | 108803096 A | 11/2018 |

(Continued)

OTHER PUBLICATIONS

European Patent Office, EP20852398.5 Extended European Search Report dated Aug. 19, 2022.

(Continued)

*Primary Examiner* — Harry K Liu
(74) *Attorney, Agent, or Firm* — HOUTTEMAN LAW LLC (57) ABSTRACT

The present disclosure provides a phase shifter and an antenna. The phase shifter includes a first substrate and a second substrate opposite to each other; a signal transmission structure between the first substrate and the second substrate, wherein the signal transmission structure is configured to transmit a microwave signal; a phase shifting structure between the first substrate and the second substrate, wherein the phase shifting structure is configured to adjust a phase of the microwave signal; wherein the signal transmission structure includes a connection structure on the signal transmission structure; the signal transmission structure is connected to the phase shifting structure through the connection structure; the phase shifter further includes: an (Continued)

isolation structure between the first substrate and the second substrate; wherein the isolation structure is on the connection structure and separates a dielectric layer of the signal transmission structure from a dielectric layer in the phase shifting structure.

19 Claims, 3 Drawing Sheets

(58) Field of Classification Search
USPC .......................................................... 342/372
See application file for complete search history.

(56) References Cited

FOREIGN PATENT DOCUMENTS

| CN | 208060906 U | 11/2018 | | |
|---|---|---|---|---|
| CN | 208298996 U | 12/2018 | | |
| CN | 209913001 U | 1/2020 | | |
| DE | 102018107908 A1 | * | 1/2019 | ....... H01L 21/02236 |
| EP | 1128459 A2 | | 8/2001 | |
| TW | 201814237 A | | 4/2018 | |
| WO | WO-2018115896 A2 | * | 6/2018 | ........... B81B 7/0064 |

OTHER PUBLICATIONS

Ding et al., "Bifunctional co-design of liquid crystal phase shifter and band-stop filter," J. Phys. D: Appl. Phys. Jul. 31, 2019, vol. 52, No. 415002, pp. 1-8.

Berniguad et al., "Liquid Crystal Tunable Filter Based On DBR Topology," Proc. 36th Euro. Microwave Conf., Sep. 1, 2006, pp. 368-371.

Deo et al., "Beam Steering 60 GHz Slot Antenna Array using Liquid Crystal Phase Shifter," Conference paper, The 8th European Conf. on Antenna and Propagation, Sep. 17, 2014, pp. 1005-1007.

* cited by examiner

PHASE SHIFTER AND ANTENNA

CROSS REFERENCE TO RELATED APPLICATIONS

The present application claims the priority of the Chinese Patent Application No. 201910750772.X filed on Aug. 14, 2019, the content of which is incorporated herein by reference in its entirety.

TECHNICAL FIELD

The present disclosure belongs to the field of communication technology, and particularly relates to a phase shifter and an antenna.

BACKGROUND

A liquid crystal phase shifter with low loss mainly includes a structure having a single port or a structure having dual ports. In the dual-port phase shifter, it is required to first divide energy equally by a power divider, and then transfer the energy to a phase shifting portion at a rear end via two transmission lines. The power divider has a dielectric of air, which may ensure that dielectric constants of the dielectric are the same under different voltages, impedance at each position is kept unchanged, and the energy is divided equally; the phase shifting portion has a dielectric of liquid crystals, and the dielectric constant thereof varies with the voltage.

SUMMARY

In a first aspect, an embodiment of the present invention provides a phase shifter, including: a first substrate and a second substrate opposite to each other; a signal transmission structure between the first substrate and the second substrate, wherein the signal transmission structure is configured to transmit a microwave signal; a phase shifting structure between the first substrate and the second substrate, wherein the phase shifting structure is configured to adjust a phase of the microwave signal; wherein the signal transmission structure includes a connection structure on the signal transmission structure; the signal transmission structure is connected to the phase shifting structure through the connection structure; the phase shifter further includes: an isolation structure between the first substrate and the second substrate; wherein the isolation structure is on the connection structure and separates a dielectric layer of the signal transmission structure from a dielectric layer in the phase shifting structure.

In one embodiment of the present disclosure, the phase shifter includes a first signal transmission region, a second signal transmission region, and a phase adjustment region; wherein the first substrate and the second substrate are opposite to each other in the first signal transmission region, the second signal transmission region, and the phase adjustment region; wherein the signal transmission structure includes a first signal transmission structure and a second signal transmission structure, wherein the first signal transmission structure is in the first signal transmission region and is configured to transmit the microwave signal to the phase shifting structure; the phase shifting structure is in the phase adjustment region and configured to adjust the phase of the microwave signal from the first signal transmission structure and transmit the microwave signal with an adjusted phase to the second signal transmission structure; and the second signal transmission structure is in the second signal transmission region and is configured to output the microwave signal with the adjusted phase; wherein the first signal transmission structure is connected to the phase shifting structure through a connection structure on the first signal transmission structure; the second signal transmission structure is connected to the phase shifting structure through a connection structure on the second signal transmission structure.

In one embodiment of the present disclosure, the isolation structure is on the connection structure between the first signal transmission structure and the phase shifting structure, and separates a dielectric layer of the first signal transmission structure from a dielectric layer in the phase shifting structure; and/or the isolation structure is on the connection structure between the second signal transmission structure and the phase shifting structure, and separates a dielectric layer of the second signal transmission structure from a dielectric layer in the phase shifting structure.

In one embodiment of the present disclosure, a material of the isolation structure includes a sealant.

In one embodiment of the present disclosure, the connection structure on the first signal transmission structure and the connection structure on the second signal transmission structure each include: a reference electrode on a side of the first substrate distal to the second substrate, a coupling branch and a delay branch on a side of the first substrate proximal to the second substrate, and a receiving electrode on a side of the second substrate proximal to the first substrate; and the first signal transmission structure and the second signal transmission structure each include a power divider; the phase shifting structure includes: a first transmission line on a side of the first substrate proximal to the second substrate; and a second transmission line on a side of the second substrate proximal to the first substrate, wherein in each of the first and second signal transmission structures, each of the coupling branch and the delay branch forms a current loop with the reference electrode; in each of the first and second signal transmission structures, a first end of the coupling branch and a first end of the delay branch are both connected to respective signal output ends of the power divider; a second end of the delay branch is connected to the first transmission line in the phase shifting structure; and a second end of the coupling branch is floated; in each of the first and second signal transmission structures, an orthographic projection of the coupling branch on the second substrate at least partially overlaps with an orthographic projection of the receiving electrode on the second substrate; the receiving electrode is connected to the second transmission line in the phase shifting structure.

In one embodiment of the present disclosure, in each of the first and second signal transmission structures, a length of the coupling branch is shorter than that of the delay branch, or the length of the coupling branch and the length of the delay branch are the same.

In one embodiment of the present disclosure, in each of the first and second signal transmission structures, a length of the coupling branch is in a range of 1 mm to 30 mm.

In one embodiment of the present disclosure, in each of the first and second signal transmission structures, a minimum distance between the coupling branch and the delay branch is 2 to 3 times of a line width of the coupling branch or the delay branch.

In one embodiment of the present disclosure, in each of the first and second signal transmission structures, if one of the coupling and delay branches is bent such that there is a spacing between different portions of the one of the coupling and delay branches, a minimum value of the spacing is 2 to 3 times of the line width of the coupling branch or the delay branch.

In one embodiment of the present disclosure, the first transmission line in the phase shifting structure and the delay branches and the coupling branches in the first signal transmission structure and the second signal transmission structure are in a same layer and are made of the same material; and/or, the second transmission line in the phase shifting structure and the receiving electrodes in the first signal transmission structure and the second signal transmission structure are in a same layer and are made of the same material.

In one embodiment of the present disclosure, each of the first and second signal transmission structures includes: an impedance match line on a side of the first substrate proximate to the second substrate; the phase shifting structure includes a first transmission line on a side of the first substrate proximate to the second substrate, wherein the impedance match line of each of the first and second signal transmission structures is connected to the first transmission line in the phase shifting structure.

In one embodiment of the present disclosure, the impedance match line of the first signal transmission structure includes a line-width increasing portion in which a line width of the impedance match line gradually increases in a direction from the first signal transmission region pointing toward the phase adjustment region; and the impedance match line of the second signal transmission structure includes a line-width increasing portion in which a line width of the impedance match line gradually increases in a direction from the second signal transmission region pointing toward the phase adjustment region; a length of each line-width increasing portion is one quarter wavelength of the microwave signal under an operating frequency.

In one embodiment of the present disclosure, the first transmission line in the phase shifting structure and the impedance match line of each of the first and second signal transmission structures are in a same layer and are the same material.

In one embodiment of the present disclosure, the dielectric layer in the phase adjustment region is between layers in which the first transmission line and the second transmission line are located, the dielectric layer in the phase adjustment region including liquid crystal molecules.

In a second aspect, an embodiment of the present invention provides an antenna including any one of the above phase shifters; and at least two patch units on a side of the second substrate distal to the first substrate.

DETAIL DESCRIPTION OF EMBODIMENTS

In order to make one of ordinary skill in the art understand the technical solutions of the present disclosure better, the present disclosure is described below in detail with reference to the accompanying drawings and the specific embodiments.

Unless defined otherwise, technical or scientific terms used herein shall have ordinary meanings as understood by one of ordinary skill in the art to which the present disclosure belongs. The use of "first," "second," and the like in the present disclosure is not intended to indicate any order, quantity, or importance, but rather is used to distinguish one element from another. Also, the use of the words "a," "an," or "the" and the like do not indicate a limitation for the number of items, but rather indicate the presence of at least one item. The word "comprising", "comprises", "including" or "includes" and the like means that an element or item preceding the word includes an element or item listed after the word and its equivalent, but does not exclude other elements or items. The word "connected" or "coupled" and the like is not limited to physical or mechanical connections, but may include electrical connections, regardless of direct or indirect. The words "upper", "lower", "left", "right" and the like are used only to indicate relative positional relationships among objects, and when an absolute position of a described object is changed, the relative positional relationships may be changed accordingly.

An existing liquid crystal phase shifter with low loss mainly includes a structure having a single port or a structure having dual ports. In the dual-port phase shifter, it is required to first divide energy equally by a power divider, and then transfer the energy to a phase shifting portion at a rear end via two transmission lines. The power divider has a dielectric of air, which may ensure that dielectric constants of the dielectric are the same under different voltages, impedance at each position is kept unchanged, and the energy is divided equally; the phase shifting portion has a dielectric of liquid crystals, and the dielectric constant thereof varies with the voltage. Therefore, if the dielectrics are not isolated from each other, the dielectric of the power divider will have liquid crystals, and the dielectric constant varies with the voltage, such that the impedance changes and thus the energy cannot be equally divided. Therefore, a phase shifting degree of the whole device is reduced, and the loss is increased.

The present disclosure provides a phase shifter and an antenna capable of reducing loss to solve the problems in the prior art.

It should be noted that, in the embodiment of the present disclosure, there are two signal transmission regions which are disposed on two opposite sides of a phase adjustment region. Specifically, a signal transmission region located on a left side of the phase adjustment region is a first signal transmission region, and a signal transmission region located on a right side of the phase adjustment region is a second signal transmission region. The first signal transmission region and the second signal transmission region are respectively provided with signal transmission structures which are a first signal transmission structure and a second signal transmission structure, respectively; one of the first signal transmission structure and the second signal transmission structure is used for introducing a microwave signal, and the other one is used for outputting the microwave signal with a changed phase after the phase of the microwave signal is shifted by the phase shifter. In this embodiment, the first signal transmission structure and the second signal transmission structure may be the same or different; in the present embodiment, a case will be described as an example where the first signal transmission structure and the second signal transmission structure are the same. That is, the phase shifter provided in the embodiment of the present disclosure is a reciprocal phase shifter.

In the embodiment of the present disclosure, the first signal transmission structure and the second signal transmission structure are both dual-port structures; each of the first signal transmission structure and the second signal transmission structure includes a delay branch, a coupling branch, a receiving electrode and a power divider; for the first signal transmission structure, a first end of the delay branch and a first end of the coupling branch are respectively connected to two signal output ends of the power divider, and projections of the coupling branch and the receiving electrode are at least partially overlapped with each other; for the second signal transmission structure, a first end of the delay branch and a first end of the coupling branch are respectively connected to two signal output ends of the power divider, and projections of the coupling branch and the receiving electrode are at least partially overlapped with each other; a second end of the delay branch in the first signal transmission structure is connected to a left end of a first transmission line, and a second end of the delay branch in the second signal transmission structure is connected to a right end of the first transmission line; the receiving electrode in the first signal transmission structure is connected to a left end of a second transmission line, and the receiving electrode in the second signal transmission structure is connected to a right end of the second transmission line.

In the embodiment of the present disclosure, no matter whether the first signal transmission structure or the second signal transmission structure, a reference electrode thereof usually adopts a ground electrode (of course, any electrode capable of having a certain voltage difference with the coupling branch and the delay branch). In this embodiment, a case will be described as an example where the reference electrode is a ground electrode. In this embodiment, a specific position of the ground electrode depends on the transmission structure formed by the ground electrode, the coupling branch and the delay branch. Specifically, in the embodiment of the present disclosure, the delay branch, the coupling branch, and the ground electrode form a transmission structure, including, but are not limited to, any one of a micro-strip line transmission structure, a strip line transmission structure, a coplanar waveguide transmission structure, and a substrate integrated waveguide transmission structure. In the following embodiments, in order to describe a feeding structure in the present embodiment in cooperation with the phase shifting structure, a case will be also described as an example where the micro-strip line transmission structure is formed by the delay branch, the coupling branch and the ground electrode. At this time, a ground electrode in the feeding structure is positioned on a side of a first substrate distal to a dielectric layer, and is connected with the ground electrode in the phase shifting structure. Of course, the ground electrode in the feeding structure and the ground electrode in the phase shifting structure may be integrally formed.

The first signal transmission structure and the second signal transmission structure are both single-port structures; the first signal transmission structure and the second signal transmission structure each include: an impedance match line; and the impedance match line in the first signal transmission structure is connected to the left end of the first transmission line, and the impedance match line in the second signal transmission structure is connected to the right end of the first transmission line.

The dielectric layers in the first signal transmission structure and the second signal transmission structure of the phase shifter include (but are not limited to) air, and the dielectric layer in the phase shifting structure includes (but is not limited to) liquid crystals; in the following specific implementation, a case will be also described as an example where the dielectric layers in the first signal transmission structure and the second signal transmission structure are air, and the dielectric layer in the phase shifting structure is liquid crystals. It should be understood that, in the embodiment of the present disclosure, the dielectric layers of the first and second signal transmission structures of the phase shifter (that is, the dielectric layers of the first and second signal transmission structures) are air; the dielectric layer in the phase adjustment region (that is, the dielectric layer in the phase shifting structure) is the liquid crystals.

Figure 1:
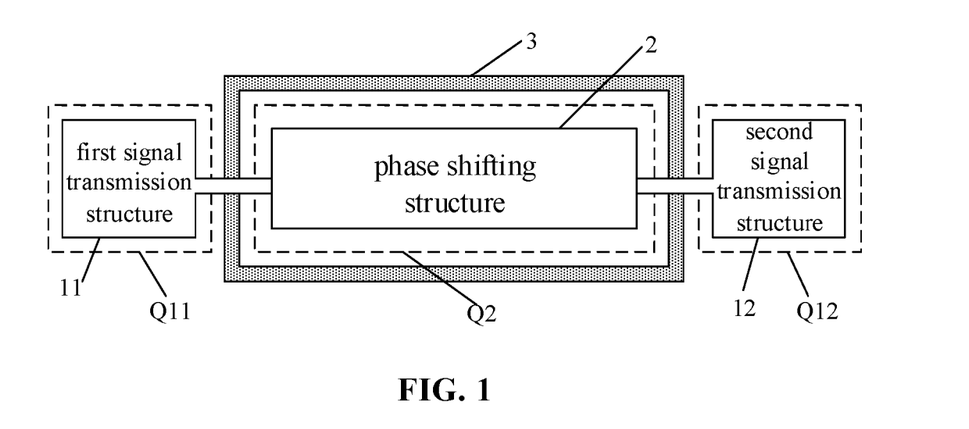
FIG. 1 is a schematic top view of a phase shifter according to an embodiment of the present disclosure.
Figure 2:
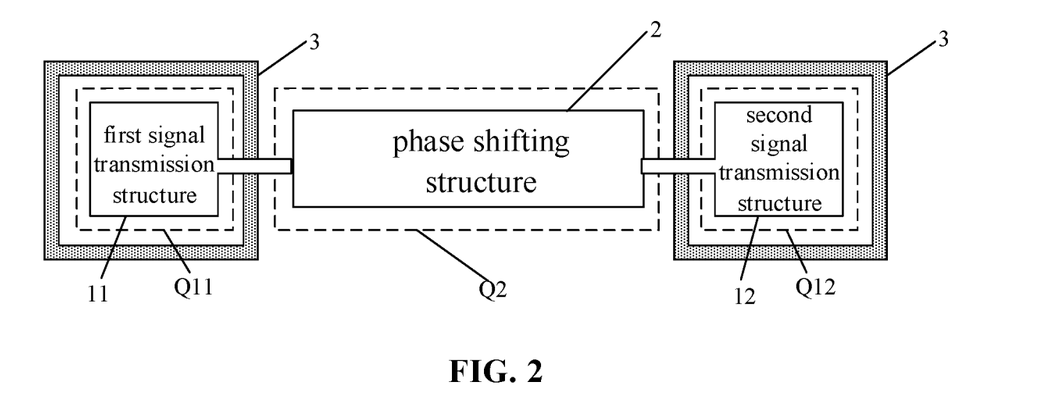
FIG. 2 is a schematic top view of a phase shifter according to an embodiment of the present disclosure.
Figure 4:
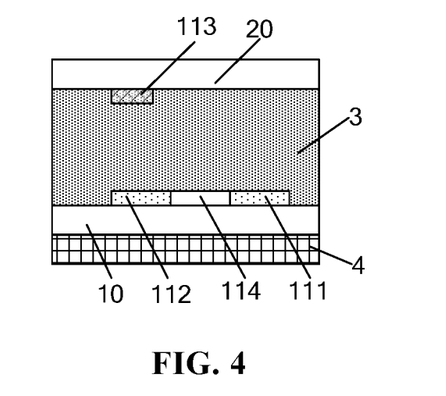
FIG. 4 is a side view of a first signal transmission structure 11 of FIG. 3 as viewed from a left side.
Figure 5:
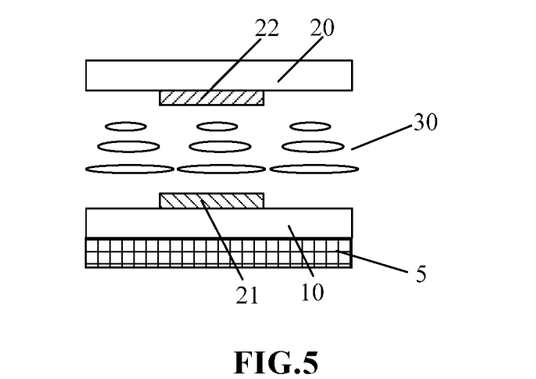
FIG. 5 is a side view of the phase shifting structure of FIG. 3 as viewed from a left side.

In a first aspect, as shown in FIG. 1 and FIG. 2, the embodiment of the present disclosure provides a phase shifter, which specifically, may be a liquid crystal phase shifter, including a first signal transmission region Q11, a second signal transmission region Q12, and a phase adjustment region Q2. Referring to FIGS. 4 and 5, the phase shifter includes a first substrate 10 and a second substrate 20 disposed opposite to each other; wherein, between the first substrate 10 and the second substrate 20, a first signal transmission structure 11 is disposed at a position corresponding to the first signal transmission region Q11, a second signal transmission structure 12 is disposed at a position corresponding to the second signal transmission region Q12, and a phase shifting structure 2 is disposed at a position corresponding to the phase adjustment region Q2. The first signal transmission structure 11 is used for introducing the microwave signal into the phase shifting structure 2 so as to adjust the phase of the microwave signal by the phase shifting structure 2; the second signal transmission structure 12 is used for outputting the microwave signal with a phase adjusted by the phase shifting structure 2. The dielectric layers in the first signal transmission structure 11 and the second signal transmission structure 12 are air, and the dielectric layer in the phase shifting structure 2 is liquid crystals. In particular, an isolation structure 3 is further disposed between the first substrate 10 and the second substrate 20, and is used for separating the dielectric layers in the first signal transmission structure 11 and the second signal transmission structure 12 from the dielectric layer in the phase shifting structure 2.

In some embodiments of the present disclosure, since the phase shifting structure 2 is connected to the first signal transmission structure 11 or the second signal transmission structure 12 via corresponding connection structures (such as a delay branch, a coupling branch, and a receiving electrode described below) disposed on the corresponding transmission structures. Therefore, in order to strictly limit the liquid crystals in the phase shifting structure 2 and ensure that the dielectric of the first signal transmission structure 11 and/or the second signal transmission structure 12 is pure air, it is only necessary to introduce a sealant on the connection structures between the first signal transmission structure 11 and the phase shifting structure 2 and/or between the second signal transmission structure 12 and the phase shifting structure 2, so that the input energy may be equally divided, and the whole device has a phase shift degree of 360 degrees and has low loss.

Because the isolation structure 3 is disposed in the phase shifter according to the embodiment of the present disclosure, and the isolation structure 3 may separate the dielectric layers in the first signal transmission structure 11 and the second signal transmission structure 12 from the dielectric layer in the phase shifting structure 2, the liquid crystal dielectric layer 30 in the phase shifting structure 2 may be limited in the phase shifting structure, so as to ensure that the dielectric layers in the first signal transmission structure 11 and the second signal transmission structure 12 are still air. Compared with the case where liquid crystals are used as a dielectric layer, the air is used as a dielectric layer, such that the loss of the microwave signals transmitted in the first signal transmission structure 11 and the second signal transmission structure 12 may be effectively reduced, thereby reducing the loss of the whole phase shifter.

In some embodiments of the present disclosure, as shown in FIG. 1, the isolation structure 3 is disposed around the phase adjustment region Q2, separating the phase adjustment region from the first and second signal transmission regions Q11 and Q12, while separating the air dielectric layers located respectively in the first and second signal transmission regions Q11 and Q12 from the liquid crystal dielectric layer 30 located in the phase adjustment region Q2. The reason why the isolation structure 3 is disposed around the phase adjustment region Q2 is that the phase adjustment region Q2 has a larger area than the first signal adjustment region Q11 and the second signal transmission region Q12, and therefore, the isolation structure 3 is formed more easily when being coated. Of course, it is also possible to dispose the isolation structure 3 around the first signal transmission region Q11 and the second signal transmission region Q12, as shown in FIG. 2. In the embodiment shown in FIG. 2, it is necessary to dispose the isolation structure 3 around the first signal adjustment region Q11 and the second signal transmission region Q12, respectively.

In some embodiments of the present disclosure, a material of the isolation structure 3 includes, but is not limited to, a sealant. The sealant is used because the sealant has a good sealing performance, and may separate the liquid crystal dielectric layer in the phase adjustment region Q2 from the air dielectric layers in the first signal transmission region Q11 and the second signal transmission region Q12 better. In some embodiments of the present disclosure, the sealant mainly includes: a thermal curing adhesive and an ultraviolet (UV) curing adhesive. The embodiments of the present disclosure also provide a phase shifter in combination with FIGS. 3 to 5, the phase shifting structure 2 of the phase shifter may generally include a first transmission line 21 disposed on a side of the first substrate 10 proximal to the second substrate 20 and a ground electrode 5 on a side of the first substrate 10 distal to the second substrate 20; a second transmission line 22 disposed on a side of the second substrate 20 proximal to the first substrate 10, and a liquid crystal dielectric layer 30 disposed between a layer where the first transmission line 21 is disposed and a layer where the second transmission line 22 is disposed; wherein the first transmission line 21 and the second transmission line 22 spatially overlap with each other. That is, an orthographic projection of the first transmission line 21 on the first substrate 10 or the second substrate 20 overlaps with an orthographic projection of the second transmission line 22 on the first substrate 10 or the second substrate 20.

Both the first signal transmission structure 11 and the second signal transmission structure 12 of the phase shifter each may be a dual-port structure; the first signal transmission structure 11 and the second signal transmission structure 12 are the same, except that the first signal transmission structure 11 is used for inputting a microwave signal, and the second signal transmission structure 12 is used for outputting the microwave signal, so the first signal transmission structure 11 is descripted as an example, for convenience.

Figure 3:
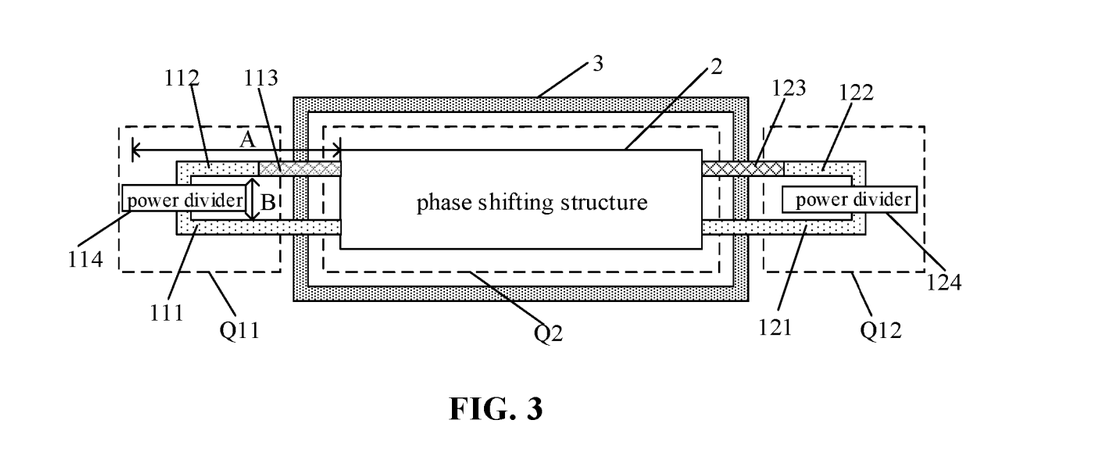
FIG. 3 is a schematic top view of a phase shifter with a dual-port signal transmission structure according to an embodiment of the present disclosure.

As shown in FIGS. 3 and 4, the first signal transmission structure 11 may specifically include: a coupling branch 112 and a delay branch 111 disposed on a side of the first substrate 10 proximal to the second substrate 20 (correspondingly, the second signal transmission structure 12 includes: a coupling branch 122 and a delay branch 121 disposed on a side of the first substrate 10 proximal to the second substrate 201), a ground electrode 4 disposed on a side of the first substrate 10 distal to the coupling branch 112 and the delay branch 111, and a receiving electrode 113 disposed on a side of the second substrate 20 proximal to the coupling branch 112 and the delay branch 111; wherein a first end of the coupling branch 112 and a first end of the delay branch 111 are both connected to the power divider 114; a second end of the delay branch 111 is connected to the first transmission line 21 in the phase shifting structure 2, a second end of the coupling branch 112 is floated, that is, the second end of the coupling branch 112 is not connected to any component and is in a floated state; an orthographic projection of the coupling branch 112 on the second substrate 20 at least partially overlap with an orthographic projection of the receiving electrode 113 on the second substrate 20; the receiving electrode 113 is connected to the second transmission line 22 in the phase shifting structure 2; each of the coupling branch 112 and the delay branch 111 form a current loop with the ground electrode 4.

In some embodiments of the present disclosure, since the phase shifting structure 2 is connected to the first signal transmission structure 11 or the second signal transmission structure 12 via the corresponding delay branch, coupling branch and receiving electrode disposed on the corresponding transmission structure, in order to strictly limit the liquid crystals in the phase shifting structure 2 and ensure that the dielectric of the first signal transmission structure 11 and/or the second signal transmission structure 12 is pure air, it is only necessary to introduce the sealant on the delay branch 111, the coupling branch 112 and the receiving electrode 113 between the first signal transmission structure 11 and the phase shifting structure 2, and/or introduce the sealant on the delay branch 121, the coupling branch 122 and the receiving electrode 123 between the second signal transmission structure 12 and the phase shifting structure 2, so that the input energy may be equally divided, and the whole device has a phase shift degree of 360 degrees and has low loss.

It should be understood that the microwave signals propagated by the delay branch 111 and the coupling branch 112 are high frequency signals. In this embodiment, the current loop means that a certain voltage difference exists between the delay branch 111 and the ground electrode 4 and between the coupling branch 112 and the ground electrode 4, meanwhile, the delay branch 111 is connected to the first transmission line 21 in the phase shifting structure, and the receiving electrode 113 is connected to the second transmission line 22 to transmit the microwave signal, and finally, the microwave signal flows back to the ground electrode 4, that is, forming the current loop.

In the embodiment of the present disclosure, the microwave signal is input by the power divider 114, is divided into two paths with a same power via the delay branch 111 and the coupling branch 112, and then the microwave signal transmitted by the coupling branch 112 is coupled to the receiving electrode 113 on the second substrate 20 and is transmitted through the second transmission line 22 in the phase shifting structure 2; the microwave signal transmitted by the delay branch 111 is still transmitted through the first transmission line 21 in the phase shifting structure 2 on the first substrate 10, the microwave signal transmitted by the coupling branch 112 and the microwave signal transmitted by the delay branch 111 form a mode of differential signal; then the differential signals in the lower delay branch 111 and the upper receiving electrode 113 are transmitted into the phase shifting structure through a matching structure. The phase shifting function is achieved by changing the dielectric constant of the liquid crystals in the phase shifting structure. Finally, the signals are combined through a power dividing and coupling structure, and then output through the power divider 124. Since the present invention is not focused on the phase shifting structure, the phase shifting principle will not be described in detail.

It should be noted that, taking a T-shaped power divider as an example, the power divider has one signal input end and two signal output end s (i.e., a first signal output end and a second signal output end); the signal input end of the power divider 114 is connected to the signal line for inputting the microwave signal, the first signal output end is connected to the delay branch 111, and the second signal output end is connected to the coupling branch 112. Therefore, the microwave signal input from a microwave signal source to the signal input end of the power divider 114 carries a certain power P, which is divided equally by the power divider 114 and then transmitted to the delay branch 111 through the first signal output end, and to the coupling branch 112 through the second signal output end. At this time, the power of the microwave signal transmitted by each of the coupling branch 112 and the delay branch 111 are half of the power of the microwave signal carried by the signal input end, that is, 1/2P. Of course, the power divider 114 may also be a four-port power divider, such as a 3DB bridge. The power divider may be selected according to product requirements.

In this embodiment, taking the first transmission line 21 and the second transmission line 22 in the phase shifting structure as micro-strip lines as an example, the ground electrode 5 is disposed on a side of the first substrate 10 distal to the first transmission line 21, the first transmission line 21 and the second transmission line 22 may adopt comb-shaped electrodes, the ground electrode 5 in the phase shifting structure may adopt a planar electrode, and the ground electrode 5 is connected to the ground electrodes 4 in the first signal transmission structure and the second signal transmission structure, or the two ground electrodes are integrally formed, that is, the first transmission line 21, the second transmission line 22 and the ground electrodes form a micro-strip line transmission structure. Of course, the first transmission line 21, the second transmission line 22 and the ground electrodes may also form any one of a strip line transmission structure, a coplanar waveguide transmission structure and a substrate integrated waveguide transmission structure, which are not listed here.

In the embodiment of the present disclosure, if lengths of the delay branch 111 and the coupling branch 112 in the first signal transmission structure 11 are the same, the microwave signal with the power P is divided into two parts by the power divider 114, at this time, the power carried by the microwave signal received by each of the delay branch 111 and the coupling branch 112 is 1/2P, and the phase delays are also the same. Meanwhile, certain voltages are respectively applied to the first transmission line 21 and the second transmission line 22, and there is a certain voltage difference between the applied voltages, so that the liquid crystal dielectric layer 30 is rotated, the dielectric constant of the liquid crystal dielectric layer 30 changes, the phases of the microwave signals transmitted in the liquid crystal dielectric layer 30 in the first transmission line 21 and the second transmission line 22 change, realizing the phase shift of the microwave signals.

The structure of the second signal transmission structure 12 is the same as that of the first signal transmission structure 11, and therefore, will not be described in detail. A function of the delay branch 121 of the second signal transmission structure 12 is to output the microwave signal output by the first transmission line 21 of the phase shifting structure 2 to the power divider 124; and a function of the receiving electrode 123 of the second signal transmission structure 12 is to couple the microwave signal output from the second transmission line 22 of the phase shifting structure 2 to the coupling branch 122, for outputting to the power divider 124, and then the power divider 124 outputs the microwave signal.

In summary, for the phase shifter having the dual-port signal transmission structure, in this embodiment, the isolation structure 3 separates the first signal transmission structure 11 and the second signal transmission structure 12 from the phase shifting structure 2. That is, the isolation structure 3 separates the air dielectric layer from the liquid crystal dielectric layer 30, so that the dielectric layers of the first signal transmission structure 11 and the second signal transmission structure 12 only include air, which may ensure that the dielectric constants of the dielectric layers of the first signal transmission structure 11 and the second signal transmission structure 12 are not changed under different voltages, and that the impedances of the delay branch 111 and the coupling branch 112 are not changed, so that the energies of the microwave signals distributed to the delay branch 111 and the coupling branch 112 by the power divider are equally divided, and further it is ensured that the phase shift degree of the phase shifter reaches 360°, and the loss of the microwave signals is low. The whole phase shifter has a phase shift degree of 360 degrees and has low loss for the microwave signals.

In the embodiment of the present disclosure, for the phase shifter having the dual-port signal transmission structure, a total length of the first signal transmission structure 11 (the second signal transmission structure 12), (that is, the total length A of a length of the signal line to which the signal input end of the power divider is connected and (plus) a length of the coupling branch (or the delay branch)), may be designed to be 1 mm to 30 mm according to different operating frequencies. In order to prevent coupling capacitance generated between the delay branch 111 and the coupling branch 112 (and similarly, the delay branch 121 and the coupling branch 122) from affecting transmission of microwave signals on the delay branch 111 and the coupling branch 112, a minimum distance B between the delay branch 111 and the coupling branch 112 may be set to be 2 to 3 times of a line width of the coupling branch 112 (or the delay branch 111). The line widths of the delay branch 111 and the coupling branch 112 at respective positions may be equal, or the line widths of the delay branch 111 and the coupling branch 112 at respective positions may be designed correspondingly according to the impedance.

In the embodiment of the present disclosure, the delay branch 111, the coupling branch 112 of the first signal transmission structure 11 and the delay branch 121, the coupling branch 122 of the second signal transmission structure 12, and the first transmission line 21 are all disposed on the first substrate 10 and are made of the same material; and the receiving electrode 113, the receiving electrode 123 and the second transmission line 22 are all disposed on the second substrate 20 and are made of the same material (for example, a metal material). Therefore, an overall cell gap of the phase shifter may be effectively reduced, and the delay branch 111, the coupling branch 112, the delay branch 121 and the coupling branch 122 are formed by one single process, and the receiving electrode 113, the receiving electrode 123 and the second transmission line 22 are formed by one single process, so that the process cost may be reduced, and the production efficiency may be improved. Of course, the delay branch 111, the coupling branch 112 of the first signal transmission structure 11 and the delay branch 121, the coupling branch 122 of the second signal transmission structure 12 and the first transmission line 21 are all disposed on the first substrate 10 and are made of the same material; or, the receiving electrodes 113, 123 and the second transmission lines 22 are all disposed on the second substrate 20 and are made of the same material. The process cost may be reduced, and the production efficiency may be improved.

Figure 6:
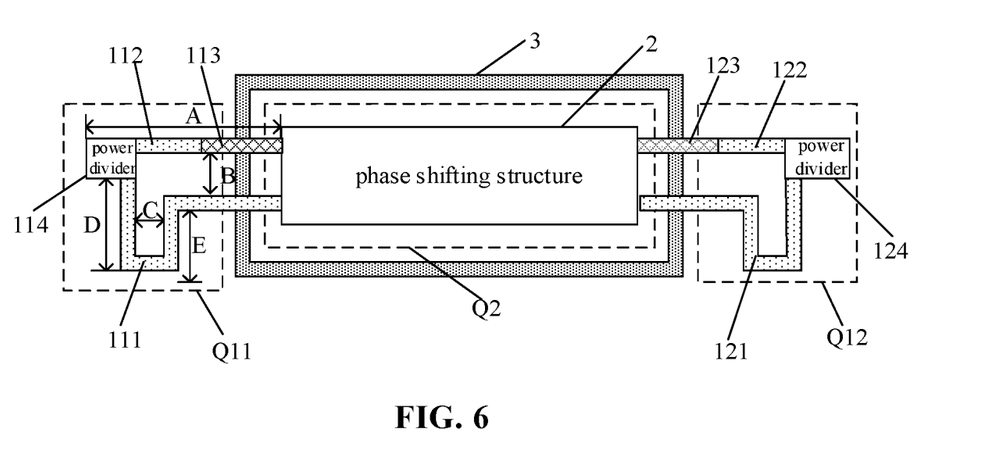
FIG. 6 is a schematic top view of a phase shifter with a dual-port signal transmission structure according to an embodiment of the present disclosure.
Figure 7:
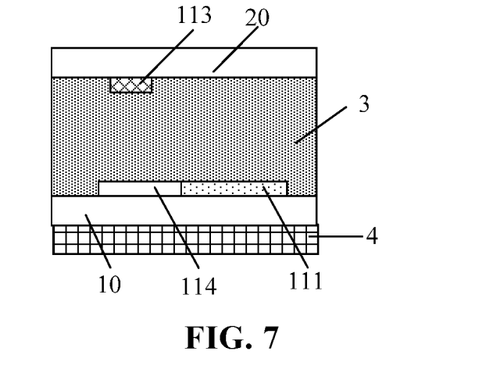
FIG. 7 is a side view of a first signal transmission structure 11 of FIG. 6 as viewed from a left side.

As shown in FIGS. 6 and 7, the embodiment of the present disclosure further provides a phase shifter, which may have a structure substantially the same as that of the phase shifter described above, except that the delay branch 111 and the coupling branch 112 of the first signal transmission structure 11 (the delay branch 121 and the coupling branch 122 of the second signal transmission structure 12) are designed to have different lengths, so that the power of the microwave signal distributed to the delay branch 111 and the coupling branch 112 by the power divider 114 is divided equally, but the phases of the transmitted microwave signals of the delay branch 111 and the coupling branch 112 are different. That is, the phase of the longer one of the delay branch 111 and the coupling branch 112 is more delayed.

In the embodiment of the present disclosure, it is preferable that the length of the delay branch 111 is longer than that of the coupling branch 112. The reason is in that the longer the length is, the more the loss of the microwave signal is, but the microwave signal transmitted by the coupling branch 112 is necessarily coupled to the receiving electrode 113 and then transmitted to the second transmission line 21. In this process, the microwave signal would have a loss. If the length of the coupling branch 112 is increased, the loss of the microwave signal transmitted by the coupling branch is increased, so the length of the delay branch 111 is designed to be longer than that of the coupling branch 112. As shown in FIG. 6, the length of the coupling branch 112 plus the length of the power divider 114 are A; the length of the delay branch is A+D+E.

Further, the delay branch 111 (the delay branch 121) may be designed to be any one of a bow-shaped, a wave-shaped, and a sharp pulse-shaped. Taking the delay branch 111 designed in the bow-shaped as an example, the total length A of a length of the signal line to which the signal input end of the power divider 114 is connected and a length of the coupling branch 112 may be designed to be 1 mm to 30 mm according to different operating frequencies. In order to prevent coupling capacitance generated between the delay branch 111 and the coupling branch 112 from affecting transmission of microwave signals on the delay branch 111 and the coupling branch 112, a minimum distance B between the delay branch 111 and the coupling branch 112 may be set to be 2 to 3 times of a line width of the coupling branch 112 (or the delay branch 111).

In an embodiment of the present disclosure, in each of the first signal transmission structure and the second signal transmission structure, one of the coupling branch and the delay branch is bent such that a spacing exists between different portions of the one of the coupling branch and the delay branch, a minimum value of the spacing is 2 to 3 times a line width of the coupling branch or the delay branch. For example, a width C (shown in FIG. 6) of each bent portion (similar to a U shape) of the bow-shaped delay branch 111 is set to be 2 to 3 times the line width of the coupling branch 112 (or the delay branch).

The line widths of the delay branch 111 and the coupling branch 112 at respective positions may be equal, or the line widths of the delay branch 111 and the coupling branch 112 at respective positions may be designed correspondingly according to the impedance. Similarly, if the coupling branch 112 is also designed to be bow-shaped, the width (not shown in the figure) of each bent portion (similar to a U shape) of the bow-shaped coupling branch 112 is set to be 2 to 3 times the line width of the coupling branch 112 (or the delay branch).

The remaining components of the phase shifter are substantially the same as those of the phase shifter having the dual-port signal transmission structure, and therefore are not described in detail.

Figure 8:
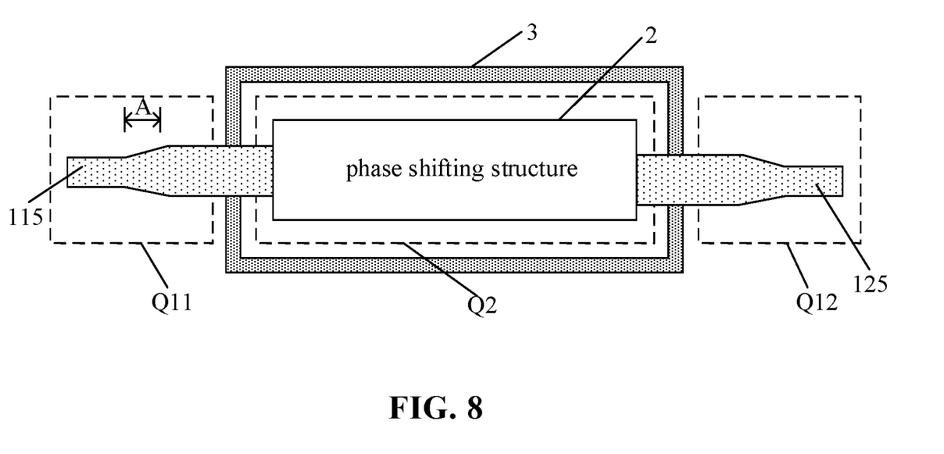
FIG. 8 is a schematic top view of a phase shifter with a single-port signal transmission structure according to an embodiment of the present disclosure.
Figure 9:
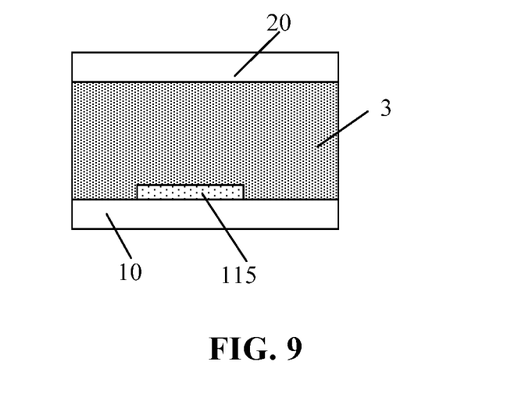
FIG. 9 is a side view of a first signal transmission structure 11 of FIG. 8 as viewed from a left side.

As shown in FIGS. 8 and 9, the embodiment of the present disclosure further provides a phase shifter, which has substantially the same structure as the phase shifter described above, except that the first signal transmission structure 11 and the second signal transmission structure 12 of the phase shifter in this embodiment are both single-port structures, and the first signal transmission structure 11 and the second signal transmission structure 12 respectively include an impedance match line 115 and an impedance match line 125 disposed on the first substrate 10; the impedance match line 115 and the impedance match line 125 are connected to the first transmission line 21 in the phase shifting structure 2. Specifically, the impedance match line 115 of the first signal transmission structure 11 is connected to the left end of the first transmission line 21 for introducing the microwave signal; the impedance match line 125 of the second signal transmission structure 12 is connected to the right end of the first transmission line 21 for outputting the microwave signal with a phase adjusted by the phase shifting structure 2.

In this embodiment, the air dielectric layers of the signal transmission structure and the liquid crystal dielectric layer 30 of the phase shifting structure 3 are separated by the isolation structure 3, and the dielectric layers of the impedance match line 115 and the impedance match line 125 are air with low power consumption, so the loss of the whole phase shifter device may be reduced.

In the embodiment of the present disclosure, each of the impedance match line 115 and the impedance match line 125 includes a line-width increasing portion (a portion with an increasing line width) in which a line width of the impedance match line gradually increases in a direction from the signal transmission region pointing to the phase adjustment region; a length of the portion is one quarter wavelength of the microwave signal under the operating frequency. For example, as shown in FIG. 8, the length A of the line-width increasing portion is one quarter wavelength of the microwave signal under the operating frequency, and the line width of the impedance match line 115 gradually increases in certain length in a direction from the first signal transmission region Q11 pointing to the phase adjustment region Q2; the line width of the impedance match line 125 gradually increases in certain length in a direction from the second signal transmission region Q12 pointing to the phase adjustment area Q2. Of course, the line widths of the impedance match line 115 and the impedance match line 125 may be designed according to different impedances as required.

The remaining components of the phase shifter are substantially the same as those of the phase shifter having the dual-port signal transmission structure, and therefore are not described in detail.

In some embodiments of the present disclosures, the first substrate 10 and the second substrate 20 may be glass substrates with a thickness of 100 to 1000 microns, or may be sapphire substrates, or may be polyethylene terephthalate substrates, triallyl cyanurate substrates, or polyimide transparent flexible substrates with a thickness of 10 to 500 microns. Specifically, the first substrate 10 and the second substrate 20 may be made of high-purity quartz glass having extremely low dielectric loss. Compared with a common glass substrate, the first substrate 10 and the second substrate 20 are made of quartz glass, so that the loss of microwaves may be effectively reduced, and the phase shifter has a low power consumption and a high signal-to-noise ratio.

In some embodiments of the present disclosures, the materials of the first transmission line 21, the second transmission line 22 and the ground electrode may be made of metals such as aluminum, silver, gold, chromium, molybdenum, nickel or iron. And the first transmission line 21 and the second transmission line 22 may be made of transparent conductive oxide.

In the embodiment of the present disclosure, the liquid crystal molecules in the liquid crystal dielectric layer 30 are positive liquid crystal molecules or negative liquid crystal molecules. It should be noted that the main difference between the positive liquid crystal molecules and the negative liquid crystal molecules is that the liquid crystal molecules have different rotation directions. Initial phase matching directions of the positive molecules and the negative molecules should be at an angle of 90° with respect to a second electrode. That is, the initial phase matching directions of both the positive liquid crystal molecules and the negative liquid crystal molecules are parallel to a Panel direction in a non-energized state. The second electrode is directed from the first substrate 10 to the second substrate 20 in a direction of an electric field formed by the overlapping of the upper and lower substrates. In an energized state, a long axis of the positive liquid crystal molecules rotates along the direction of the electric field. In contrast, in an energized state, a long axis direction of the negative liquid crystal molecules rotates toward a direction perpendicular to the direction of the electric field. This ensures that the dielectric constant of the liquid crystal layer is changed after the liquid crystal molecules are rotated, so as to achieve the phase shift.

The embodiment of the present disclosure further provides a liquid crystal antenna, which includes any one of the above phase shifters. In the embodiment of the present disclosure, at least two patch units are further provided on a side of the second substrate distal to the liquid crystal dielectric layer, wherein a gap between any two adjacent patch units and a gap between electrode strips are correspondingly provided. Microwave signals are coupled to the patch units through the electrode strips for radiation. In this way, the microwave signal with a phase adjusted by any of the above phase shifters may be radiated from the gap between the patch units.

It should be understood that the above embodiments are merely exemplary embodiments employed to illustrate the principles of the present disclosure, but the present disclosure is not limited thereto. It will be apparent to one of ordinary skill in the art that various changes and modifications can be made therein without departing from the spirit and scope of the disclosure, and these changes and modifications are to be considered within the scope of the present disclosure.

What is claimed is:

1. A phase shifter, comprising:
a first substrate and a second substrate opposite to each other;
a signal transmission structure between the first substrate and the second substrate, wherein the signal transmission structure is configured to transmit a microwave signal;
a phase shifting structure between the first substrate and the second substrate, wherein the phase shifting structure is configured to adjust a phase of the microwave signal;
wherein the signal transmission structure comprises a connection structure on the signal transmission structure; the signal transmission structure is connected to the phase shifting structure through the connection structure;
the phase shifter further comprises:
an isolation structure between the first substrate and the second substrate; wherein the isolation structure is provided on the connection structure and separates a dielectric layer of the signal transmission structure from a dielectric layer of the phase shifting structure,
wherein the phase shifter comprises a first signal transmission region, a second signal transmission region, and a phase adjustment region;
wherein the first substrate and the second substrate are opposite to each other in the first signal transmission region, the second signal transmission region, and the phase adjustment region;
wherein the signal transmission structure comprises a first signal transmission structure and a second signal transmission structure,
wherein the first signal transmission structure is provided in the first signal transmission region and is configured to transmit the microwave signal to the phase shifting structure;
the phase shifting structure is in the phase adjustment region and configured to adjust the phase of the microwave signal from the first signal transmission structure and transmit the microwave signal with an adjusted phase to the second signal transmission structure; and
the second signal transmission structure is provided in the second signal transmission region and is configured to output the microwave signal with the adjusted phase;
wherein the first signal transmission structure is connected to the phase shifting structure through a connection structure on the first signal transmission structure; the second signal transmission structure is connected to the phase shifting structure through a connection structure on the second signal transmission structure.

2. The phase shifter of claim 1, wherein
the isolation structure is on the connection structure between the first signal transmission structure and the phase shifting structure, and separates a dielectric layer of the first signal transmission structure from a dielectric layer in the phase shifting structure;
and/or
the isolation structure is on the connection structure between the second signal transmission structure and the phase shifting structure, and separates a dielectric layer of the second signal transmission structure from a dielectric layer in the phase shifting structure.

3. The phase shifter of claim 1, wherein a material of the isolation structure comprises a sealant.

4. The phase shifter of claim 1, wherein the connection structure on the first signal transmission structure and the connection structure on the second signal transmission structure each comprise: a reference electrode on a side of the first substrate distal to the second substrate, a coupling branch and a delay branch on a side of the first substrate proximal to the second substrate, and a receiving electrode on a side of the second substrate proximal to the first substrate; and the first signal transmission structure and the second signal transmission structure each comprise a power divider;
the phase shifting structure comprises: a first transmission line on a side of the first substrate proximal to the second substrate; and a second transmission line on a side of the second substrate proximal to the first substrate,
wherein in each of the first and second signal transmission structures, each of the coupling branch and the delay branch forms a current loop with the reference electrode;
in each of the first and second signal transmission structures, a first end of the coupling branch and a first end of the delay branch are both connected to respective signal output ends of the power divider; a second end of the delay branch is connected to the first transmission line in the phase shifting structure; and a second end of the coupling branch is floated;
in each of the first and second signal transmission structures, an orthographic projection of the coupling branch on the second substrate at least partially overlaps with an orthographic projection of the receiving electrode on the second substrate; the receiving electrode is connected to the second transmission line of the phase shifting structure.

5. The phase shifter of claim 4, wherein in each of the first and second signal transmission structures, a length of the coupling branch is shorter than a length of the delay branch, or the length of the coupling branch and the length of the delay branch are the same.

6. The phase shifter of claim 4, wherein in each of the first and second signal transmission structures, a length of the coupling branch is in a range of 1 mm to 30 mm.

7. The phase shifter of claim 5, wherein in each of the first and second signal transmission structures, a minimum distance between the coupling branch and the delay branch is 2 to 3 times of a line width of the coupling branch or the delay branch.

8. The phase shifter of claim 7, wherein in each of the first and second signal transmission structures, one of the coupling and delay branches is bent such that there is a spacing between different portions of the one of the coupling and delay branches, and a minimum value of the spacing is 2 to 3 times of the line width of the coupling branch or the delay branch.

9. The phase shifter of claim 4, wherein the first transmission line in the phase shifting structure and the delay branches and the coupling branches in the first signal transmission structure and the second signal transmission structure are in a same layer and are made of a same material; and/or,
the second transmission line in the phase shifting structure and the receiving electrodes in the first signal transmission structure and the second signal transmission structure are in a same layer and are made of a same material.

10. The phase shifter of claim 1, wherein each of the first and second signal transmission structures comprises: an impedance match line on a side of the first substrate proximate to the second substrate;
the phase shifting structure comprises a first transmission line on a side of the first substrate proximate to the second substrate; and
the impedance match line of each of the first and second signal transmission structures is connected to the first transmission line in the phase shifting structure.

11. The phase shifter of claim 10, wherein the impedance match line of the first signal transmission structure comprises a line-width increasing portion in which a line width of the impedance match line gradually increases in a direction from the first signal transmission region pointing towards the phase adjustment region; and the impedance match line of the second signal transmission structure comprises a line-width increasing portion in which a line width of the impedance match line gradually increases in a direction from the second signal transmission region pointing towards the phase adjustment region; and
a length of the line-width increasing portion is one quarter wavelength of the microwave signal at an operating frequency.

12. The phase shifter of claim 10, wherein the first transmission line in the phase shifting structure and the impedance match line of each of the first and second signal transmission structures are in a same layer and are made of a same material.

13. The phase shifter of claim 1, wherein the dielectric layer in the phase adjustment region is between layers in which the first transmission line and the second transmission line are located, the dielectric layer in the phase adjustment region comprising liquid crystal molecules.

14. An antenna, comprising the phase shifter of claim 1; and at least two patch units on a side of the second substrate distal to the first substrate.

15. The phase shifter of claim 2, wherein the connection structure on the first signal transmission structure and the connection structure on the second signal transmission structure each comprise: a reference electrode on a side of the first substrate distal to the second substrate, a coupling branch and a delay branch on a side of the first substrate proximal to the second substrate, and a receiving electrode on a side of the second substrate proximal to the first substrate; and the first signal transmission structure and the second signal transmission structure each comprise a power divider;
the phase shifting structure comprises: a first transmission line on a side of the first substrate proximal to the second substrate; and a second transmission line on a side of the second substrate proximal to the first substrate, wherein in each of the first and second signal transmission structures, each of the coupling branch and the delay branch forms a current loop with the reference electrode;

in each of the first and second signal transmission structures, a first end of the coupling branch and a first end of the delay branch are both connected to respective signal output ends of the power divider; a second end of the delay branch is connected to the first transmission line in the phase shifting structure; and a second end of the coupling branch is floated;

in each of the first and second signal transmission structures, an orthographic projection of the coupling branch on the second substrate at least partially overlaps with an orthographic projection of the receiving electrode on the second substrate; the receiving electrode is connected to the second transmission line of the phase shifting structure.

16. The phase shifter of claim 2, wherein each of the first and second signal transmission structures comprises: an impedance match line on a side of the first substrate proximate to the second substrate;

the phase shifting structure comprises a first transmission line on a side of the first substrate proximate to the second substrate; and the impedance match line of each of the first and second signal transmission structures is connected to the first transmission line in the phase shifting structure.

17. The phase shifter of claim 2, wherein the dielectric layer in the phase adjustment region is between layers in which the first transmission line and the second transmission line are located, the dielectric layer in the phase adjustment region comprising liquid crystal molecules.

18. The antenna of claim 14, wherein the phase shifter comprises a first signal transmission region, a second signal transmission region, and a phase adjustment region;

wherein the first substrate and the second substrate are opposite to each other in the first signal transmission region, the second signal transmission region, and the phase adjustment region;

wherein the signal transmission structure comprises a first signal transmission structure and a second signal transmission structure, wherein the first signal transmission structure is provided in the first signal transmission region and is configured to transmit the microwave signal to the phase shifting structure;

the phase shifting structure is in the phase adjustment region and configured to adjust the phase of the microwave signal from the first signal transmission structure and transmit the microwave signal with an adjusted phase to the second signal transmission structure; and the second signal transmission structure is provided in the second signal transmission region and is configured to output the microwave signal with the adjusted phase;

wherein the first signal transmission structure is connected to the phase shifting structure through a connection structure on the first signal transmission structure; the second signal transmission structure is connected to the phase shifting structure through a connection structure on the second signal transmission structure.

19. The antenna of claim 18, wherein the isolation structure is on the connection structure between the first signal transmission structure and the phase shifting structure, and separates a dielectric layer of the first signal transmission structure from a dielectric layer in the phase shifting structure;

and/or the isolation structure is on the connection structure between the second signal transmission structure and the phase shifting structure, and separates a dielectric layer of the second signal transmission structure from a dielectric layer in the phase shifting structure.

* * * * *